(12) United States Patent
Hoerger et al.

(10) Patent No.: US 12,259,299 B2
(45) Date of Patent: Mar. 25, 2025

(54) METHOD FOR MEASURING THE SIZE OF A LEAK FLOW OF A SEAL

(71) Applicant: Christian Maier GmbH & Co. KG, Heidenheim (DE)

(72) Inventors: Lukas Hoerger, Heidenheim (DE); Guenther Schwenk, Heidenheim (DE)

(73) Assignee: Christian Maier GmbH & Co. KG, Heidenheim (DE)

( * ) Notice: Subject to any disclaimer, the term of this patent is extended or adjusted under 35 U.S.C. 154(b) by 549 days.

(21) Appl. No.: 16/767,854

(22) PCT Filed: Nov. 23, 2018

(86) PCT No.: PCT/EP2018/082326
§ 371 (c)(1),
(2) Date: May 28, 2020

(87) PCT Pub. No.: WO2019/105854
PCT Pub. Date: Jun. 6, 2019

(65) Prior Publication Data
US 2020/0370992 A1 Nov. 26, 2020

(30) Foreign Application Priority Data
Nov. 30, 2017 (DE) .......................... 102017221510.0

(51) Int. Cl.
*G01M 3/28* (2006.01)
*G01M 3/00* (2006.01)

(52) U.S. Cl.
CPC .......... *G01M 3/2853* (2013.01); *G01M 3/002* (2013.01); *G01M 3/007* (2013.01)

(58) Field of Classification Search
CPC .... G01M 3/2853; G01M 3/007; G01M 3/002; F16J 15/3492; G01F 1/6847
See application file for complete search history.

(56) References Cited

U.S. PATENT DOCUMENTS 5,936,156 A      8/1999  Roberts et al.
2009/0290971 A1* 11/2009  Shamseldin .......... F04D 29/124
                                                                415/118

FOREIGN PATENT DOCUMENTS

DE      69109009 T2    11/1995
DE      19913968 A1    10/2000
(Continued)

OTHER PUBLICATIONS

English Machine Translation of Hecht et. al., KR 100244360 B1, Mar. 2000 (Year: 2000).*
(Continued)

*Primary Examiner* — David Z Huang
(74) *Attorney, Agent, or Firm* — Faegre Drinker Biddle & Reath LLP

(57) ABSTRACT

The disclosure relates to a method for measuring the size of a leakage flow of a seal. In exemplifications of the disclosure, a leakage sensor is provided on a leakage side of the seal, said leakage sensor comprising at least one heating element and at least two temperature sensors which are in heat-transferring connection with the leakage flow. In exemplifications, the following steps are utilized:

continuous or intermittent detection of a temperature difference in the leakage flow over a section of a leakage channel through which the leakage flow flows by means of the temperature sensors, wherein a predetermined constant reference heat quantity is simultaneously generated by the heating element and transferred into the leakage flow in the section of the leakage channel, and determination of the size of the current leakage flow as a function of the currently detected temperature difference; or continuously or intermittently setting a constant temperature difference in the leakage flow over a section of a leakage channel through which the leakage flow flows (Continued)

by generating a variable amount of heat with the heating element and transferring the amount of heat into the leakage flow in the section of the leakage channel, and determining the size of the current leakage flow as a function of the currently generated amount of heat.

17 Claims, 1 Drawing Sheet

(56) References Cited

FOREIGN PATENT DOCUMENTS

| | | | |
|---|---|---|---|
| DE | 102008043887 A1 | 5/2010 | |
| DE | 102012109237 A1 | 4/2014 | |
| DE | 102013105992 A1 | 7/2014 | |
| EP | 0512655 A2 * | 11/1992 | ............... G01F 1/68 |
| EP | 2314873 A2 | 10/2009 | |
| EP | 1752696 B1 | 9/2010 | |
| EP | 2336743 A1 | 6/2011 | |
| EP | 2341328 A1 | 7/2011 | |
| EP | 1916509 B1 | 12/2011 | |
| EP | 2813740 A2 | 12/2014 | |
| JP | 05-223684 A | 8/1993 | |
| JP | 2000-507705 A | 6/2000 | |
| JP | 2010-230601 A | 10/2010 | |
| JP | 2017-090155 A | 5/2017 | |
| KR | 100244360 B1 * | 3/2000 | ............... G01F 1/68 |
| WO | 97/38286 A1 | 10/1997 | |
| WO | 2012/111368 A1 | 8/2012 | |

OTHER PUBLICATIONS

International Search Search Report and Written Opinion, ISA/EP, PCT/EP2018/082326, dated Feb. 19, 2019, 16 pages.
IPRP, ISA/EP, PCT/EP2018/082326, Jan. 31, 2020, 14 pages.

* cited by examiner

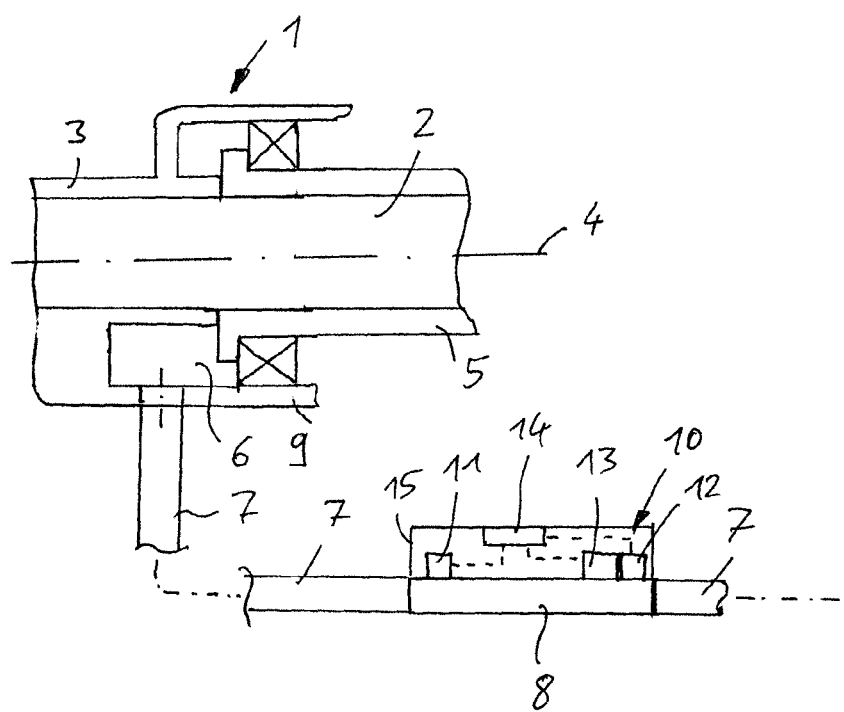

METHOD FOR MEASURING THE SIZE OF A LEAK FLOW OF A SEAL

CROSS-REFERENCE TO RELATED APPLICATIONS

The present application is a 371 U.S. National Phase patent application based on International Application No. PCT/EP2018/082326, filed Nov. 23, 2018, which claims the benefit of German Patent Application No. DE102017221510.0, filed Nov. 30, 2017, the entire disclosures of which are hereby expressly incorporated herein by reference.

The present disclosure relates to a method for measuring the size of a leakage flow of a seal, for example a mechanical seal, according to the preamble of claim 1.

BACKGROUND/SUMMARY

It is known to monitor the condition of a seal, for example a shaft seal or a rotary union, such as the present disclosure relates to in particular, by means of a leakage sensor. In this case, the leakage sensor can be positioned in a leakage channel, also called a detection channel, and measure the flow rate of the leakage medium flowing through the leakage channel. The leakage medium is a part of the medium from a chamber which is sealed by the seal. The leakage flow is therefore a flow of medium that has more or less unintentionally passed over the seal, wherein a certain leakage flow is generally expected, depending on the location and application of the seal, and the leakage flow is specified as acceptable up to a certain size. Only when the leakage flow exceeds a specified size or a size threshold can it be concluded that the seal is not functioning properly.

EP 1 752 696 B1 discloses a rotary union with a leakage sensor, wherein the leakage sensor is preferably a flow sensor operating according to the calorimetric measuring principle. In contrast, EP 2 341 328 A1 discloses a sealing arrangement with a leakage sensor comprising a diaphragm controlled by a differential pressure and a displacement sensor.

EP 2 336 743 A1 discloses a sealing arrangement with a throttle-like flow channel for the leakage and at least one sensor for detecting the leakage in the flow channel, wherein the sensor has two temperature sensors spaced apart in the direction of flow of the leakage, which are each in good heat-conducting contact with the leakage flow and at the same time are well thermally insulated from one another. In the event of a leakage, the leakage flow flows through the flow channel and thereby generates a characteristic temperature profile between the two temperature sensors, from which the leakage flow can be deduced. Accordingly, this is also a sensor that works according to the calorimetric measuring principle.

EP 2 314 873 A2 discloses a leakage sensor for a screw pump, which can be an optoelectronic sensor, a float switch or an ultrasonic sensor.

EP 1 916 509 B1 discloses a sealing arrangement with a leakage detection device, wherein the leakage detection device comprises a leakage reservoir with a non-woven disc.

EP 2 813 740 A2 discloses a rotary union with a mechanical seal, wherein the contact pressure of the mechanical seal is varied and a leakage sensor can be provided in a leakage line to control the contact pressure.

DE 199 13 968 A1 discloses a thermal flow sensor and a method for determining the flow rate of a fluid. The thermal flow sensor is equipped with a thermal conductivity measuring cell in order to be able to take composition-dependent differences of the fluid into account when measuring the flow. Since the thermal flow sensor has both a flow sensor and the thermal conductivity measuring cell, it is ensured that all measurements are always made on the same fluid. A set of curves can be specified which indicates the heating power of a first heating device as a function of a flow rate to be determined. Which curve of this set of curves must be used at a given time depends on the composition of the fluid at that time, i.e. on its thermal conductivity or the measured value relevant for this, namely a heating power supplied to a second heating device. The required information on the composition of the fluid is obtained with the aid of the thermal conductivity measuring cell, since the composition of the fluid can be determined empirically from the thermal conductivity.

DE 10 2008 043 887 A1 discloses a method and measuring system for determining and/or monitoring a change in the aggregate state of a measuring medium at a thermal flowmeter. By means of the temperature of the measuring medium, by means of the chemical composition of the measuring medium and by means of the partial pressure of at least a first part of the measuring medium and/or by means of the total pressure of the measuring medium, at least one phase boundary line of at least the first part of the measuring medium is determined, wherein at least a first measurement signal is provided from a temperature difference between a first temperature sensor and a second temperature sensor of the thermal flowmeter and/or from a heating power supplied to the measuring medium. The temperature of the measuring medium is determined by the thermal flow meter itself, data on the chemical composition of the measuring medium, the partial pressure of the relevant part of the measuring medium and/or the total pressure of the measuring medium must be specified by the operator or determined and made available with external and/or integrated measuring devices.

DE 691 09 009 T2 discloses a flowmeter with correction depending on liquid composition and temperature.

DE 10 2013 105 992 A1 discloses a thermal flow measuring device and method for determining and/or monitoring a flow rate of a medium, wherein functional dependencies of a power supplied to a thermal resistance thermometer and other parameters, such as the medium temperature, viscosity, Reynolds number, etc., are referred to. These parameters should be taken into account to improve the accuracy of the measurement.

The above-mentioned thermal flow sensors or thermal flowmeters are used, for example, for liquids or gases flowing through a pipeline. However, such a liquid or gas flow is not the leakage flow of a seal as the present disclosure relates to.

The above-mentioned leakage sensors for measuring the size of a leakage flow of a seal have the disadvantage that they have to be designed and calibrated specifically for a given individual application. In addition, measurements with the known leakage sensors have not proven to be sufficiently reliable in practice to reliably determine the current condition of a seal.

The present disclosure is based on the object of specifying a method for measuring the size of a leakage flow of a seal, which leads to better results in practice.

The object according to the disclosure is solved by a method with the features of the independent patent claims. The dependent patent claims indicate advantageous and particularly useful embodiments of the disclosure.

Although the known leakage sensors operating according to the calorimetric measuring principle work on the basis of a detected "artificially" generated temperature difference in the leakage flow and should therefore be suitable for all possible leakage flow temperatures, the inventors have recognized that in practice the absolute temperature of the leakage medium, the aggregate state and/or the composition can have a significant influence on the measurement result.

In accordance with one embodiment of the method according to the disclosure for measuring the size of a leakage flow at a seal, wherein a leakage sensor is provided on a leakage side of the seal, which sensor comprises at least one heating element and at least two temperature sensors which are in heat-transferring connection with the leakage flow, therefore not only a continuous or intermittent detection of a temperature difference in the leakage flow over a section of a leakage channel through which the leakage flow flows is provided with the temperature sensors, wherein a predetermined constant reference heat quantity is simultaneously generated with the heating element and transferred into the leakage flow in the section of the leakage channel, and the size of the current leakage flow is determined as a function of the currently detected temperature difference, but when determining the size of the current leakage flow, in addition to the currently detected temperature difference, the current absolute temperature of the leakage flow in the section through which flow occurs in front of the heating element is detected and taken into account. Thus, on the one hand, the temperature difference recorded is included in the measurement of the leakage flow and, on the other hand, the absolute temperature of the leakage flow, i.e. the medium flowing through the leakage channel, is recorded and included in the measurement, wherein different absolute temperatures can lead to different measurement results.

Additionally or alternatively, when determining the size of the current leakage flow, an aggregate state and/or the composition of a medium forming the leakage flow can be taken into account in addition to the currently recorded temperature difference.

The method according to the disclosure is therefore suitable for various media passing over a seal, for example oil and water. In particular when measuring the size of a leakage flow of a seal, preferably a mechanical seal, as provided in a rotary union, such a rotary union can be used to transfer different media from a stationary component to a rotating component or vice versa or between two components rotating at different speeds, depending on the individual application, wherein the respective medium flow is sealed with a corresponding seal. If parameters which can be set or specified for the respective application are now preferably taken into account, which specify, for example, the type of medium or the composition of the medium, a limit leakage flow rate and/or a diameter of the seal, as explained below, the method can be used very universally with one and the same seal design. In particular, a temperature or temperature range corresponding to an expected operating temperature of the medium and/or leakage flow or a corresponding temperature range can also be specified with at least one parameter.

If the size of the leakage flow is mentioned herein, it can be the volume flow or the mass flow of the leakage medium flowing through the leakage channel.

Furthermore, an alternative embodiment of the disclosure provides that instead of generating a predetermined constant reference heat quantity with the heating element, upon continuous or intermittent detection of the temperature difference in the leakage flow, a variable heat quantity is generated with the heating element and this heat quantity is transferred to the leakage flow in the section of the leakage channel, wherein a constant temperature difference in the leakage flow over a section of a leakage channel through which the leakage flow flows is set continuously or intermittently and the size of the current leakage flow is determined as a function of the amount of heat currently generated.

Preferably, before continuously or intermittently detecting a temperature difference or before continuously or intermittently setting a constant temperature difference and the associated determination of the size of the current leakage flow as a function of the currently detected temperature difference or as a function of the currently generated heat quantity, the measurement is first calibrated, wherein a predetermined temperature difference in the leakage flow over the flowed-through section is set by heating the leakage flow in the flowed-through section with the heating element, wherein the heat quantity produced by the heating element when the predetermined temperature difference is reached is determined as the reference heat quantity. This reference heat quantity is thus set as being associated with the specified temperature difference.

Preferably, the calibration of the measurement is carried out for different absolute temperatures of the leakage flow in the flowed-through section in front of the heating element and different reference heat quantities are determined and assigned to the respective absolute temperature, and this temperature assignment is taken into account when determining the size of the current leakage flow. Thus, for example, a set of curves with curves for different absolute temperatures of the leakage medium can be empirically determined and stored in a control device, so that this set of curves can be used in the later measurement, wherein, according to the then recorded absolute temperature of the leakage flow, the associated curve with the leakage flow quantity assigned to a temperature difference is selected and, according to the currently recorded temperature difference, the leakage flow quantity is determined by means of this curve.

Accordingly, the calibration of the measurement can be carried out for different aggregate states and/or different compositions of the medium and different reference heat quantities can be determined and assigned to the respective aggregate state and/or the respective composition of the medium, and in determining the size of the current leakage flow, this medium assignment can be taken into account. In particular, a set of curves can be generated, stored and used for the measurement.

According to one embodiment of the disclosure, for the calibration of the measurement, the reference heat quantity can furthermore be generated with the heating element and by selectively varying the size of the leakage flow, the temperature differences arising in the process can be detected and assigned to the respective leakage flow size, and this temperature difference assignment can be taken into account when determining the size of the current leakage flow.

The temperature difference assignment can be carried out, for example, by means of a leakage flow size-temperature difference curve and the temperature assignment can be carried out by means of an assignment of a leakage flow size-temperature difference curve to the respective absolute temperature. Accordingly, the temperature difference can be assigned by means of a leakage flow size-temperature difference curve and the medium can be assigned by means of an assignment of a leakage flow size-temperature difference curve to the respective aggregate state and/or the respective composition of the medium.

Although the assignment was shown by means of curves, other assignments can also be considered, for example by at least one mathematical function or by at least one table.

If, instead of generating a constant reference heat quantity and recording various temperature differences to determine the leakage flow size and generating corresponding leakage flow size-temperature difference curves, the temperature difference is kept constant by varying the heat quantity and the leakage flow size is determined from the necessary heat quantity, then leakage flow size-heat quantity curves can be generated accordingly and the respective curve can be assigned to the respective aggregate state and/or the respective composition of the medium or the respective absolute temperature. Here, too, instead of the assignment with curves, an assignment by at least one mathematical function or by at least one table can be considered.

In accordance with one embodiment of the disclosure, a limit leakage flow size is specified and the currently determined size of leakage flow is compared with the limit leakage flow size and a warning message or warning signal is output depending on this comparison, wherein the limit leakage flow size is specified depending on a diameter of the seal. Here it can be taken into account that a larger leakage flow is permissible with comparatively larger seals than with comparatively smaller seals.

For example, different limit leakage flow sizes are assigned to different diameters of the seal, so that during initialization or calibration of the leakage sensor or a controller assigned to it, the current seal size, for example its nominal diameter, can be entered in order to specify the limit value, the limit leakage flow size, above which a warning message or signal is to be issued.

In particular, the warning message and/or the warning signal is output if the determined current leakage flow size is equal to or greater than the specified limit leakage flow size.

The consideration of the current absolute temperature of the leakage flow and the aggregate state and/or the composition of the medium of the leakage flow can also be combined according to the disclosure.

A leakage sensor according to the disclosure for use in a method according to the disclosure comprises at least one heating element and at least two temperature sensors, wherein the temperature sensors can be positioned at a distance from one another along a leakage channel and thus enclose the flowed-through section between them. In this flowed-through section, in particular directly upstream of the downstream temperature sensor, the heating element can be provided in order to heat the leakage flow or the leakage medium before it reaches the second temperature sensor.

The leakage medium is in particular a liquid medium, for example oil or water or a mixture with oil and/or water. The leakage channel can be formed, for example, by a pipe, for example of stainless steel, in particular with a diameter between 2 mm and 10 mm, preferably between 3 mm and 5 mm, and a comparatively low wall thickness, for example of up to 0.5 mm, up to 0.3 mm or up to 0.1 mm. Temperature sensors can be applied to the tube from the outside, for example as Pt sensors. The temperature sensor located further downstream can also be a sensor with an integrated heating element.

The pipe can, for example, be connected in a flow-conducting manner, in particular by means of a hose, to a leakage chamber behind a seal, for example a mechanical seal, in particular a rotary union. The leakage flow, the size of which is to be determined, may for example be a leakage flow which, at the sealing face of a mechanical seal between the mechanical seal and the counter ring, emerges from a space sealed with the mechanical seal and flows from there, in particular via a leakage chamber, to the leakage sensor, in particular comprising the said pipe. For this purpose, the leakage sensor may be provided at a geodetically lower point than the lowest point of the mechanical seal in order to ensure that the entire leakage flow flows to the leakage sensor.

The leakage sensor can be accommodated in a housing with associated evaluation electronics in the form of a control device.

BRIEF DESCRIPTION OF THE DRAWINGS

The disclosure shall be described in the following by means of an embodiment example and the FIGURES by way for example, wherein:

FIG. 1 is an illustration of a rotary union with a mechanical seal of the present disclosure.

DETAILED DESCRIPTION

The disclosure shall be described by way of example in the following by means of an embodiment example and the FIGURES.

FIG. 1 schematically shows a rotary union with a mechanical seal 1, which seals a medium-carrying channel 2 from the environment. Only as an example, the channel 2 extends from a stationary component 3 into a component 5 rotating around an axis of rotation 4. However, this is only exemplary and the disclosure can be applied to any seal, especially to pump or compressor seals.

A leakage chamber 6 is provided on a side facing away from channel 2. This leakage chamber 6 receives medium from channel 2 via the mechanical seal 1. Leakage chamber 6 is connected to a leakage channel 7, which has a section 8 through which the leakage flow passes. In particular, the leakage channel 7 extends outside the leakage chamber 6, e.g. outside a housing 9 accommodating the mechanical seal 1, which encloses or forms the stationary component 3, for example.

A leakage sensor 10 is provided in or at section 8 of the leakage channel 7, comprising a first temperature sensor 11 and a second temperature sensor 12 and a heating element 13. The first temperature sensor 11 is positioned at an upstream end of section 8, the second temperature sensor 12 at a downstream end. In the direction of flow of the leakage flow between the first temperature sensor 11 and the second temperature sensor 12, the heating element 13 is positioned, here close or comparatively closer to the second temperature sensor 12.

In addition, a control device 14 may be provided which controls, for example, the temperature sensors 11, 12 and the heating element 13 and is arranged to carry out a method according to the disclosure. The control device 14 and the sensors 11, 12 may be positioned together with the heating element 13, in particular in a common housing 15.

According to the disclosure, the leakage sensor 10 not only detects a temperature difference of the leakage flow by means of the first temperature sensor 11 and the second temperature sensor 12, wherein the leakage medium is heated simultaneously with the heating element 13, but, for example, the first temperature sensor 11 is also used to detect the absolute temperature of the leakage flow in the flow direction upstream of the heating element 13. As explained, the aggregate state of the leakage flow and/or a composition of the same can also be used additionally or alternatively in determining the current leakage flow, for example by entering the aggregate state and/or the composition of the leakage medium into the control device 14, manually or automatically by means of a corresponding sensor which is not shown in more detail here.

LIST OF REFERENCE NUMERALS

1 Mechanical seal
2 Channel
3 Stationary component
4 Axis of rotation
5 Rotating component
6 Leakage chamber
7 Leakage channel
8 Section
9 Housing
10 Leakage sensor
11 First temperature sensor
12 Second temperature sensor
13 Heating element
14 Control device
15 Housing

The invention claimed is:

1. Method for measuring the size of a leakage flow of a seal, wherein a leakage sensor is provided on a leakage side of the seal, said leakage sensor comprising at least one heating element and at least two temperature sensors which are in heat-transferring connection with the leakage flow, comprising the following steps:
continuous or intermittent detection of a temperature difference by means of the temperature sensors in the leakage flow over a section of a leakage channel through which the leakage flow flows, wherein a predetermined constant reference heat quantity is simultaneously generated with the heating element and transmitted into the leakage flow in the section of the leakage channel, and determination of the size of the current leakage flow as a function of the currently detected temperature difference; or
continuously or intermittently setting a constant temperature difference in the leakage flow over a section of a leakage channel through which the leakage flow flows by generating a variable amount of heat with the heating element and transferring the amount of heat into the leakage flow in the section of the leakage channel, and determining the size of the current leakage flow as a function of the currently generated amount of heat;
characterized in that, when determining the size of the current leakage flow, in addition to the currently detected temperature difference when a constant reference heat quantity is generated or in addition to the currently generated heat quantity when a constant temperature difference is set, the current absolute temperature of the leakage flow in the section through which the heat flows upstream of the heating element is detected and taken into account.

2. Method according to claim 1, characterized in that, in order to calibrate the measurement, a predetermined temperature difference is set at first in the leakage flow over the flowed-through section by heating the leakage flow in the flowed-through section with the heating element, wherein the heat quantity produced by the heating element when the predetermined temperature difference is reached is determined as the reference heat quantity.

3. Method according to claim 2, characterized in that, for calibration of the measurement, the at least one reference heat quantity is also generated with the heating element and, by targeted variation of the size of the leakage flow, the temperature differences which are respectively produced in the process are detected and assigned to the respective leakage flow size, and in that this temperature difference assignment is taken into account when determining the size of the current leakage flow.

4. Method according to claim 2, characterized in that the calibration of the measurement is carried out for different absolute temperatures of the leakage flow in the flowed-through section in front of the heating element, and different reference heat quantities are determined and assigned to the respective absolute temperature, and in that this temperature assignment is taken into account when determining the size of the current leakage flow.

5. Method according to claim 2, characterized in that the calibration of the measurement is carried out for different aggregate states and/or different compositions of the medium, and different reference heat quantities are determined and assigned to the respective aggregate state and/or the respective composition of the medium, and in that this medium assignment is taken into account when determining the size of the current leakage flow.

6. Method according to claim 1, characterized in that a limit leakage flow size is specified and the currently determined size of the leakage flow is compared with the limit leakage flow size and a warning message and/or a warning signal is output as a function of this comparison, wherein the limit leakage flow size is specified as a function of a diameter of the seal, wherein different limit leakage flow sizes are assigned to different diameters of the seal.

7. Method according to claim 6, characterized in that the predetermined limit leakage flow size is predetermined as a function of at least one further parameter which is variably adjustable, wherein the at least one parameter describes at least one of the following quantities and/or specifications:
type of medium whose medium flow is sealed with the seal;
operating temperature of a medium flow sealed by the seal;
operating temperature range of a medium flow sealed by the seal.

8. Method according to claim 1, characterized in that, when determining the size of the current leakage flow, the aggregate state and/or the composition of a medium forming the leakage flow is additionally taken into account.

9. Method according to claim 1, characterized in that the size of a leakage flow of a mechanical seal in a rotary union is measured.

10. Method for measuring the size of a leakage flow of a seal, wherein a leakage sensor is provided on a leakage side of the seal, said leakage sensor comprising at least one heating element and at least two temperature sensors which are in heat-transferring connection with the leakage flow, comprising the following steps:
continuous or intermittent detection of a temperature difference by means of the temperature sensors in the leakage flow over a section of a leakage channel through which the leakage flow flows, wherein a predetermined constant reference heat quantity is simultaneously generated with the heating element and transmitted into the leakage flow in the section of the leakage channel, and determination of the size of the current leakage flow as a function of the currently detected temperature difference; or continuously or intermittently setting a constant temperature difference in the leakage flow over a section of a leakage channel through which the leakage flow flows by generating a variable amount of heat with the heating element and transferring the amount of heat into the leakage flow in the section of the leakage channel, and determining the size of the current leakage flow as a function of the currently generated amount of heat;

characterized in that, when determining the size of the current leakage flow, in addition to the currently detected temperature difference when a constant reference heat quantity is generated or in addition to the currently generated heat quantity when a constant temperature difference is set, the current absolute temperature of the leakage flow in the section through which the heat flows upstream of the heating element is detected and taken into account; and further characterized in that the calibration of the measurement is carried out for different absolute temperatures of the leakage flow in the flowed-through section in front of the heating element, and different reference heat quantities are determined and assigned to the respective absolute temperature, and in that this temperature assignment is taken into account when determining the size of the current leakage flow.

11. Method according to claim 10, characterized in that the temperature difference assignment is carried out by means of a leakage flow size-temperature difference curve and the temperature assignment is carried out by means of an assignment of a leakage flow size-temperature difference curve to the respective absolute temperature.

12. Method according to claim 10, characterized in that the heat quantity assignment is carried out by means of a leakage flow size-heat quantity curve and the temperature assignment is carried out by means of an assignment of a leakage flow size-heat quantity curve to the respective absolute temperature.

13. Method according to claim 10, characterized in that, for calibration of the measurement, the at least one reference heat quantity is also generated with the heating element and, by targeted variation of the size of the leakage flow, the temperature differences which are respectively produced in the process are detected and assigned to the respective leakage flow size, and in that this temperature difference assignment is taken into account when determining the size of the current leakage flow.

14. Method according to claim 10, characterized in that, in order to calibrate the measurement, a predetermined temperature difference is set at first in the leakage flow over the flowed-through section by heating the leakage flow in the flowed-through section with the heating element, wherein the heat quantity produced by the heating element when the predetermined temperature difference is reached is determined as the reference heat quantity.

15. Method according to claim 10, characterized in that a limit leakage flow size is specified and the currently determined size of the leakage flow is compared with the limit leakage flow size and a warning message and/or a warning signal is output as a function of this comparison, wherein the limit leakage flow size is specified as a function of a diameter of the seal, wherein different limit leakage flow sizes are assigned to different diameters of the seal.

16. Method according to claim 10, characterized in that, when determining the size of the current leakage flow, the aggregate state and/or the composition of a medium forming the leakage flow is additionally taken into account.

17. Method according to claim 10, characterized in that the size of a leakage flow of a mechanical seal in a rotary union is measured.

* * * * *